Oct. 25, 1960 A. SISCO 2,957,249
PRECISION INSTRUMENT
Filed Sept. 25, 1957 4 Sheets-Sheet 1
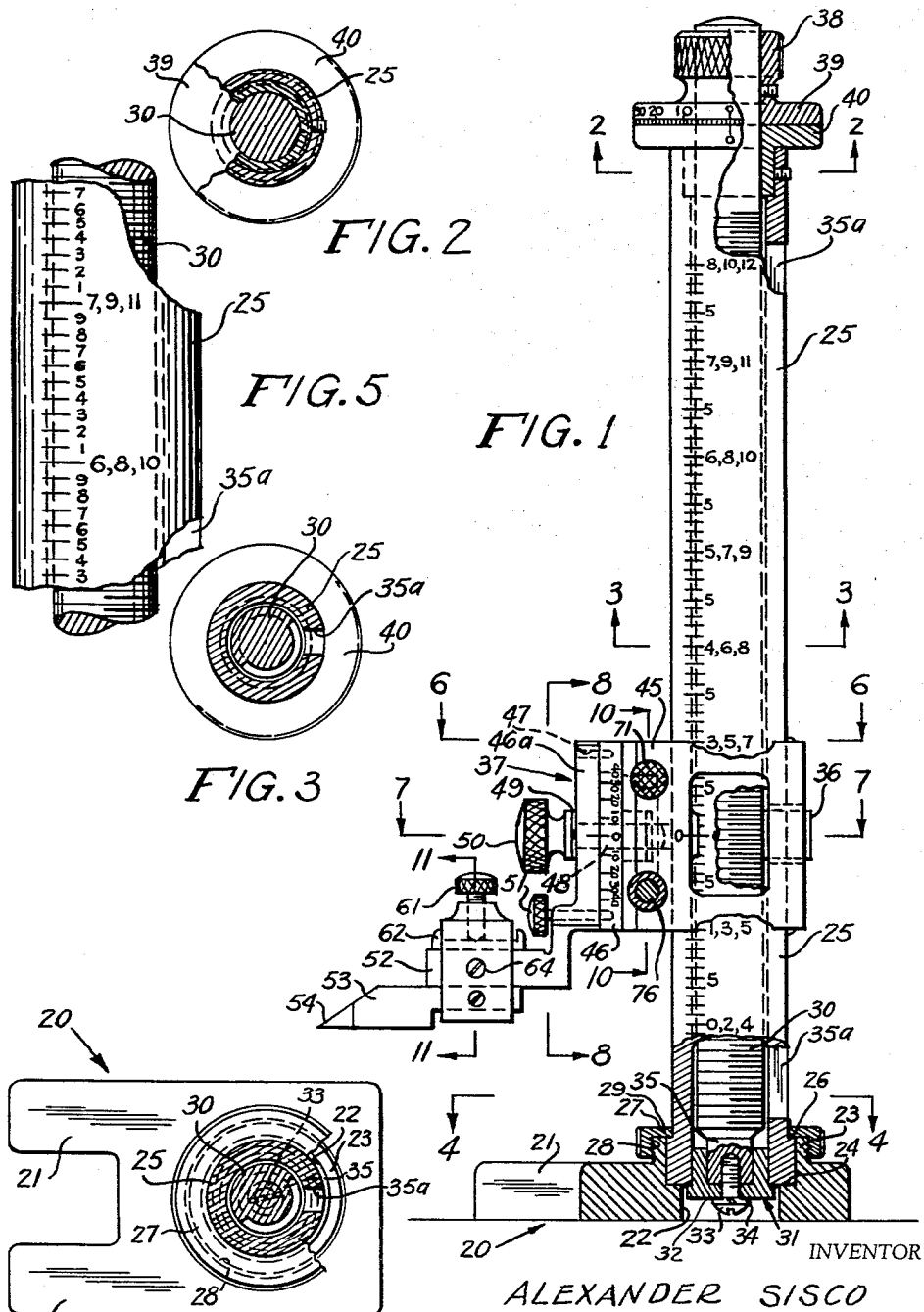
INVENTOR
ALEXANDER SISCO
BY E. E. Vrooman Leo.,
ATTORNEYS Oct. 25, 1960 A. SISCO 2,957,249
PRECISION INSTRUMENT
Filed Sept. 25, 1957 4 Sheets-Sheet 2
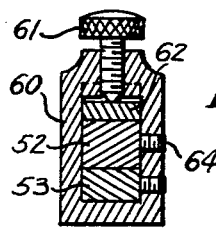
FIG. 11
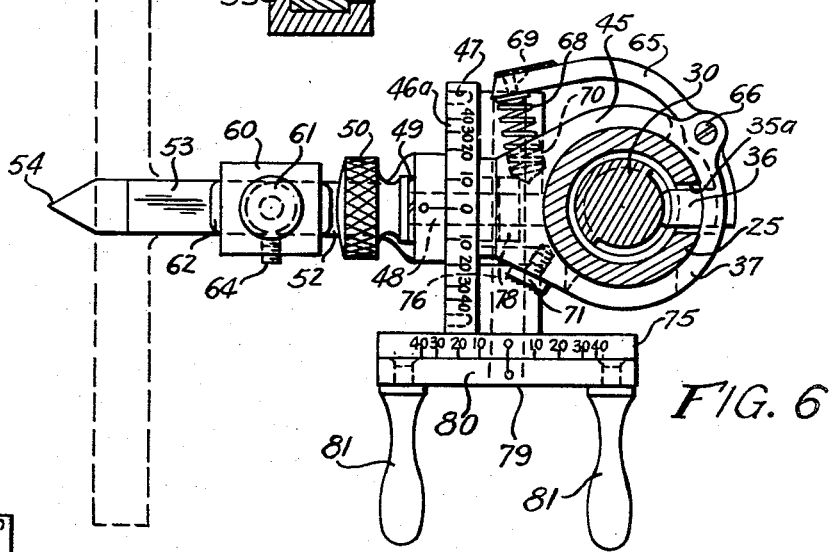
FIG. 6
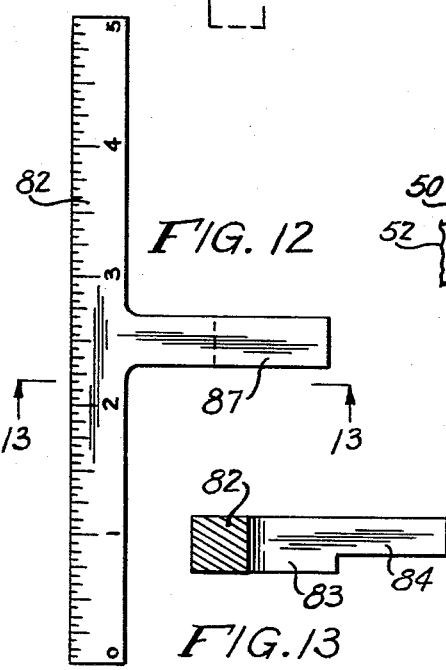
FIG. 12
FIG. 13
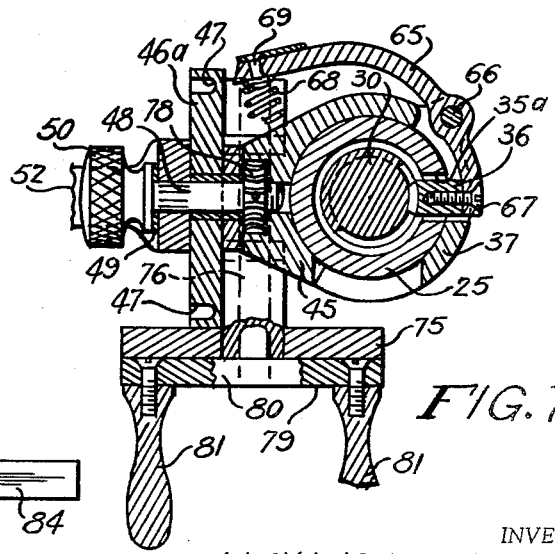
FIG. 7
INVENTOR
ALEXANDER SISCO
BY E. E. Vrooman & Co.
ATTORNEYS

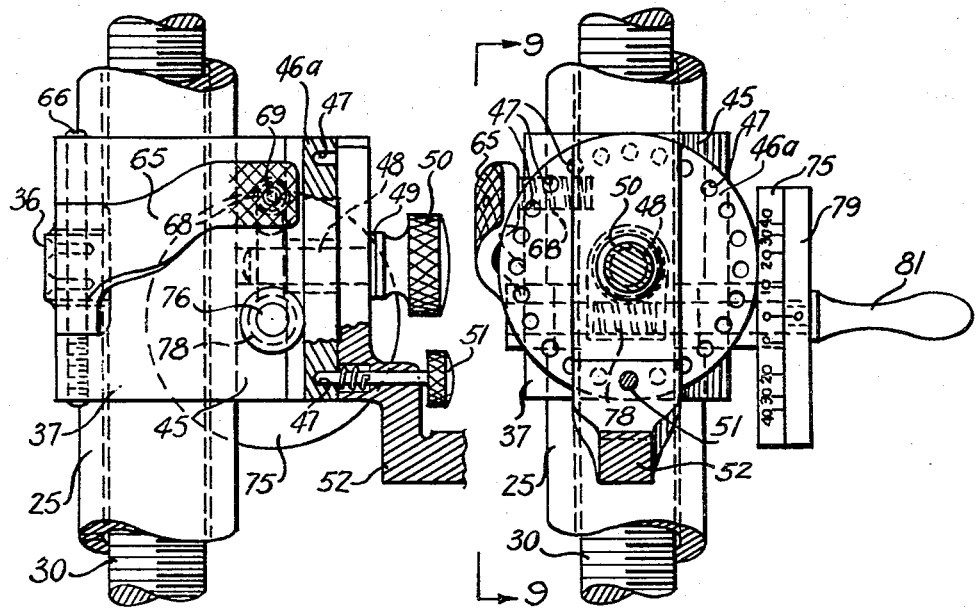
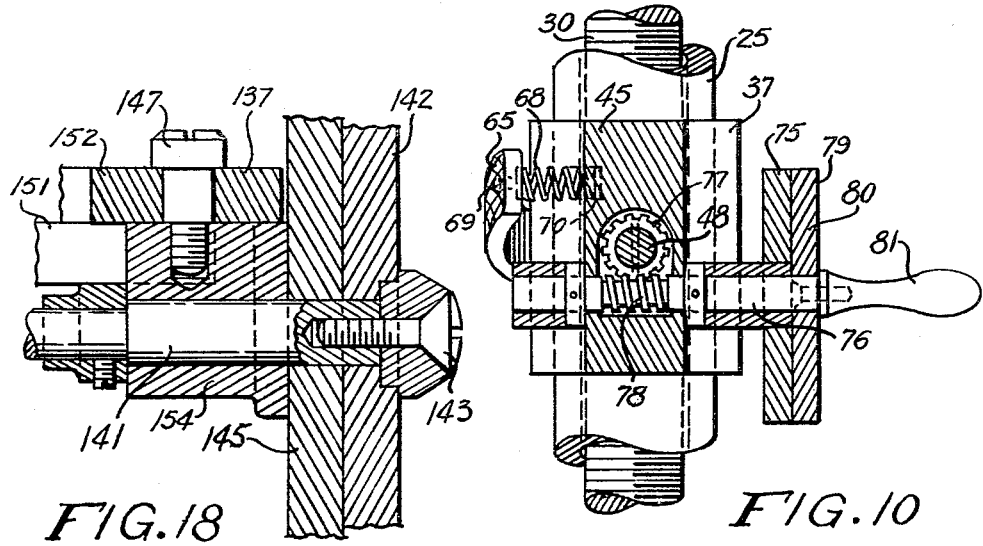

Oct. 25, 1960  A. SISCO  2,957,249
PRECISION INSTRUMENT
Filed Sept. 25, 1957  4 Sheets-Sheet 4
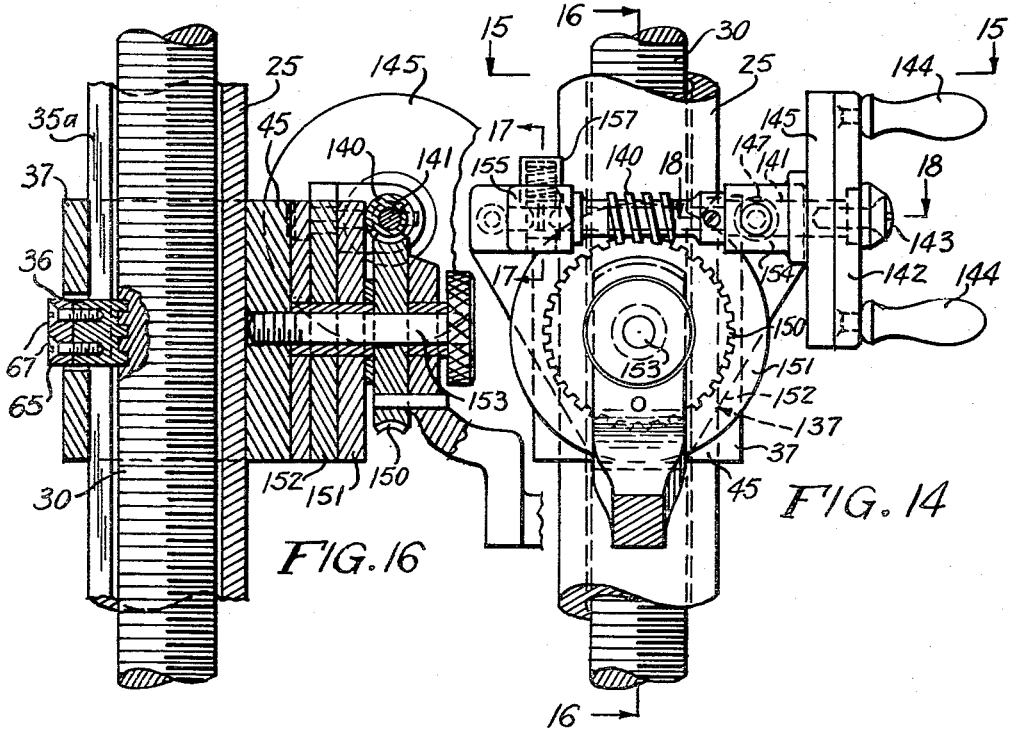
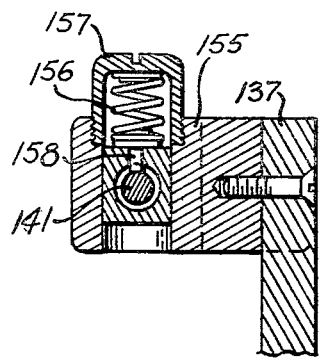
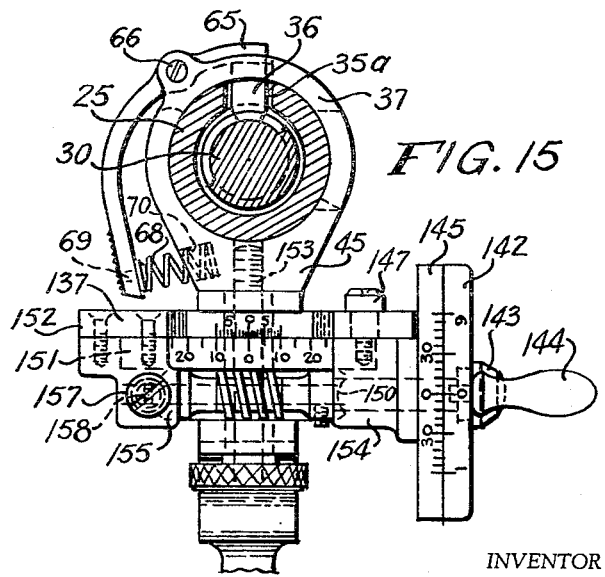
INVENTOR
ALEXANDER SISCO
BY E. E. Trooman Leo
ATTORNEYS United States Patent Office 2,957,249
Patented Oct. 25, 1960

2,957,249

PRECISION INSTRUMENT

Alexander Sisco, 1704 Fremont Ave., Tucson, Ariz.

Filed Sept. 25, 1957, Ser. No. 686,105

5 Claims. (Cl. 33—171)

This invention relates to a precision instrument, and more particularly to a micrometric height finder.

A primary object of the invention is the provision of an improved micrometric height gauge having a minimum of operating parts and adjustments with which a precise height may be determined with an extremely high degree of accuracy.

A further object of the invention is the provision of such a device provided with a rotatable head whereby angles and divisions may be readily scribed to be used as a comparator or planar gauge for laying out sines, cosines, tangents, cotangents, and the like.

Still another object of the invention is the provision of such a device provided with a dial plate and having a series of openings therein, and a coacting locking tooth for positive fast indexing.

A still further object is the provision of a device of this character so arranged as not to require over one turn of the micrometer dial for any one specified reading.

A still further object of the invention resides in the provision of any apparatus which eliminates the necessity for the computation of chords of circles, sines, cosines, tangents, and the like, by providing direct reading indicia therefor.

Still another object of this invention is the provision of a device of this character which is provided with a spring biased locking arm for securing a crosshead in releasable engagement with a threaded micrometric helix for adjustment thereof.

A more specific object is the provision, in a modified form of the invention, of worm gear means for exact adjustment of portions of the mechanism.

A further detailed object of the invention is the provision of an elongated scribing member which may be substituted for the conventional scribers of the standard instrument.

A still further object of the invention is the provision of a device of this character which is sturdy and durable in construction, reliable, efficient, and extremely accurate in operation, and relatively simple and inexpensive to manufacture and assemble.

Still other objects reside in the combinations of elements, arrangements of parts and features of construction.

Other objects will in part be obvious and in part be pointed out hereinafter and shown in the accompanying drawings, wherein there are illustrated preferred embodiments of this inventive concept.

In the drawings:

Figure 1 is a side view, partly in elevation and partly in section, showing one embodiment of the instant invention.

Figure 2 is a sectional view taken substantially along the line 2—2 of Figure 1 as viewed in the direction of the arrows.

Figure 3 is a sectional view taken substantially along the line 3—3 of Figure 1, as viewed in the direction of the arrows.

Figure 4 is a sectional view taken substantially along the line 4—4 of Figure 1, as viewed in the direction of the arrows.

Figure 5 is an enlarged fragmentary detail view of a portion of Figure 1.

Figure 6 is a sectional view taken substantially along the line 6—6 of Figure 1 as viewed in the direction of the arrows.

Figure 7 is a sectional view taken substantially along the line 7—7, Figure 1 as viewed in the direction of the arrows.

Figure 8 is a sectional view taken substantially along the line 8—8 of Figure 1 as viewed in the direction of the arrows.

Figure 9 is a sectional view taken substantially along the line 9—9 of Figure 8 as viewed in the direction of the arrows.

Figure 10 is a sectional view taken substantially along the line 10—10 of Figure 1 as viewed in the direction of the arrows.

Figure 11 is a sectional view taken substantially along the line 11—11 of Figure 1 as viewed in the direction of the arrows.

Figure 12 is a plan view of an attachment for the device of Figure 1.

Figure 13 is a sectional view taken substantially along the line 13—13 of Figure 12.

Figure 14 is a view corresponding to Figure 8, but disclosing a modified form of construction.

Figure 15 is a sectional view taken substantially along the line 15—15 of Figure 14 as viewed in the direction of the arrows.

Figure 16 is a sectional view taken substantially along the line 16—16 of Figure 14 as viewed in the direction of the arrows.

Figure 17 is a fragmentary enlarged sectional view taken substantially along the line 17—17 of Figure 14 as viewed in the direction of the arrows, and Figure 18 is a fragmentary, enlarged, sectional view taken substantially along the line 18—18 of Figure 14 as viewed in the direction of the arrows.

Similar reference characters refer to similar parts throughout the several views of the drawings.

Having reference now to the drawings in detail, there is generally indicated at 20 a base having a pair of laterally projecting tongues 21 and a central aperture 22, surrounded by an upstanding externally-threaded flange 23; the aperture 22 being provided with an integral shoulder 24 upon which seats the lower end of a tubular member 25. The lower end of tubular member 25 is provided with a shoulder 26 and is adapted to be clamped in position by means of a locking collar 27 including an internally threaded vertical flange 28 engaging the threads of flange 23 and a peripheral horizontal flange 29 overlying shoulder 26 of tubular member 25.

Positioned internally of tubular member 25 is a helically-threaded member 30, which has its lower end seated in a cup-shaped bushing 31 having an upstanding flange extending interiorly of tube 25 and a horizontal flange 32 seating against the lower end thereof. A screw 33 provided with a spring washer 34 extends inwardly into cup-shaped bushing 31, and threadedly engages the lower reduced end 35 of member 30, permitting free rotation of the member 30.

The tubular member 30 is provided with a groove 35a extending substantially the full length thereof, in which is mounted a key 36 carried by a crosshead generally indicated at 37. The key 36 is threaded to correspond to the threads of member 30 so that rotation of member 30, by means of a knurled knob 38 carried at the top thereof will occasion upward and downward movement of crosshead 37. Knob 38 includes a suitably graduated dial 39 carrying indicia which are adapted to be correlated with corresponding indicia 40 on a disc or dial carried by tubular member 25 in immediate juxtaposition to dial 39. Other suitable indicia are carried by tubular member 25 to be correlated with the position of crosshead 37.

The crosshead 37 includes a projection 45 on the side opposite key 36 which carries a disc or dial 46, bearing suitable indicia, to which is secured a plate 46a having a series of openings 47 therein, the securing means taking the form of a screw 48 having a spring washer 49 positioned between its head 50 and projection 45. A lock pin 51 is adapted selectively to engage in a selected opening for quick adjustment of the device.

The plate 46a has a projecting lug 52 having a smooth under surface, to which is normally secured a scribing point 53 having a sharp edge 54. The securing means may take the form of a clamp 60, as best shown in Figure 11, comprised of a rectangular member including a set screw 61 for clamping the parts in related assembly. A chock block 62 is positioned between member 52 and set screw 61. A lock screw 64 is also provided for engaging set screw 61 laterally (see Fig. 6).

Means are also provided for releasing the engagement of lug 36 with threaded member 30 when it is desired to rotate the scribing point 54 and take the form of a lever 65 (see Figs. 6 and 7) pivotally secured to crosshead 37 as by means of a pivot 66 and having at one end a flat headed screw 67 engaging in key 36 and engaging at its other end a compression spring 68, as by means of a bolt or rivet 69, the inner end of spring 68 seating in a suitable means 70 in crosshead 37. Thumb plates 71 are provided on cross head 37 so that pressure on the end of lever 65 adjacent spring 68 will release the threads of key 36 from engagement with threads of member 30.

Means are also provided for micrometrically rotating the scribing point and take the form of a fixed dial 75 having a control aperture through which extends a shaft 76 which carries a worm gear 78, as best shown in Figures 6 and 7, for rotating disc 46a. An operating handle member 79, which includes a dial 80 having graduations thereon, confronts dial 75 for further micrometric adjustment. Operating handles 81 are provided on dial 80.

Figures 12 and 13 disclose a T-construction which may be substituted for scribing point 54 by loosening screw 61 when it is desired to extend the radius or tangent of a line beyond the limit defined by the scribing point. The T-construction includes a graduated linear rule 82 provided with a stem 83 reduced as at 84 to permit its insertion in clamp 61.

The means for rotating the cross head 37 assumes particular importance when this T construction is substituted for the scribing point. Under these conditions the use of a separate scribing point permits a relatively large number of tangential lines to be described at any selected angular relation to each other and to the axis of the cross head.

In the modified form of construction disclosed in Figures 14 to 18, the tubular member 25, the threaded member 30, the key 36, and the lever arrangement 65, 66, 67, 68, and 69 are identical with the previous modification, but the crosshead 137 is distinguished from that of the previous modification by the omission of the apertured disc 46a. In this instance, a worm 140 carried by a shaft 141 is secured to a movable graduated dial 142 by means of a screw 143. The dial carries operating handles 144 and confronts a fixed dial 145, both dials being suitably graduated. A set screw 147 serves to hold the dial 145 in a desired position of adjustment.

The worm 140 acts on a gear 150 carried by a second movable graduated dial 151 secured in confronting relation to a fixed graduated dial 152 by means of a screw 153.

The worm 140 is suitably journalled at either end in journals 154 and 155, the latter including an adjusting spring 156 contained with a cup 157 and carrying a pin 158, which engages the shaft 154 to insure accurate alignment of the worm.

Obviously the graduations on tubular member 25 and on any of the various graduated dials hereinbefore described may be arranged to suit varying conditions, and by suitable adjustment of the various dials any number of measurements and mathematical computations may be worked out.

From the foregoing it will now be seen that there is herein provided an improved precision height measuring apparatus which accomplishes all of the objects of this invention and many others of great practical utility and commercial importance.

As many embodiments may be made of this inventive concept and as many modifications may be made in the embodiment hereinbefore illustrated and described, it is to be understood that all matter herein is merely illustrative and not in a limiting sense.

What I claim as my invention is:

1. In a precision height measuring instrument, the combination of a base, a graduated tubular member secured to said base, a threaded member rotatable in said tubular member, a keyway in said tubular member, a transversely grooved key slidable in said keyway and engageable with said threaded member, a crosshead carrying said key whereby rotation of said rotatable member raises or lowers said crosshead relative to said tubular member, a T-head carried by said crosshead, means for adjusting said crosshead to a selected angular adjustment relative to said tubular member, said means including a stationary graduated dial, and an apertured rotatable dial, said crosshead being carried by said rotatable dial, means for rotating said rotatable dial, a locking pin carried by said stationary dial engaging in a selected one of the apertures for holding said crosshead in a selected position of angular adjustment, and means for micrometric adjustment of said crosshead and hence said T-head independently of said first-mentioned means for adjusting said crosshead.

2. The structure of claim 1 wherein means are provided for releasing said key from said threaded member while said crosshead and hence said T-head is being adjusted angularly.

3. The structure of claim 2 wherein the last-mentioned means comprise a spring pressed lever pivoted to said crosshead and engaging said key.

4. The structure of claim 3 wherein releasable clamping means is provided for securing said T-head in said crosshead.

5. The structure of claim 1 wherein said last-mentioned means comprises a second stationary dial, a shaft mounted transversely to said first stationary dial, a second rotatable dial carried by said last-mentioned shaft, a worm gear carried by said last-mentioned shaft, an axle mounting said first-mentioned rotatable dial, and a gear carried by said axle engaged by said worm gear.

References Cited in the file of this patent

UNITED STATES PATENTS

| 491,926 | Nutt | Feb. 14, 1893 |
| 519,703 | Ekman | May 15, 1894 |
| 1,289,946 | Sorby | Dec. 31, 1918 |
| 2,400,715 | Sandberg | May 21, 1946 |

FOREIGN PATENTS

| 746,119 | Great Britain | Mar. 7, 1956 |